Feb. 13, 1968  R. L. CARLSON  3,368,697
CUSHIONING DEVICE
Filed March 22, 1966  2 Sheets-Sheet 2
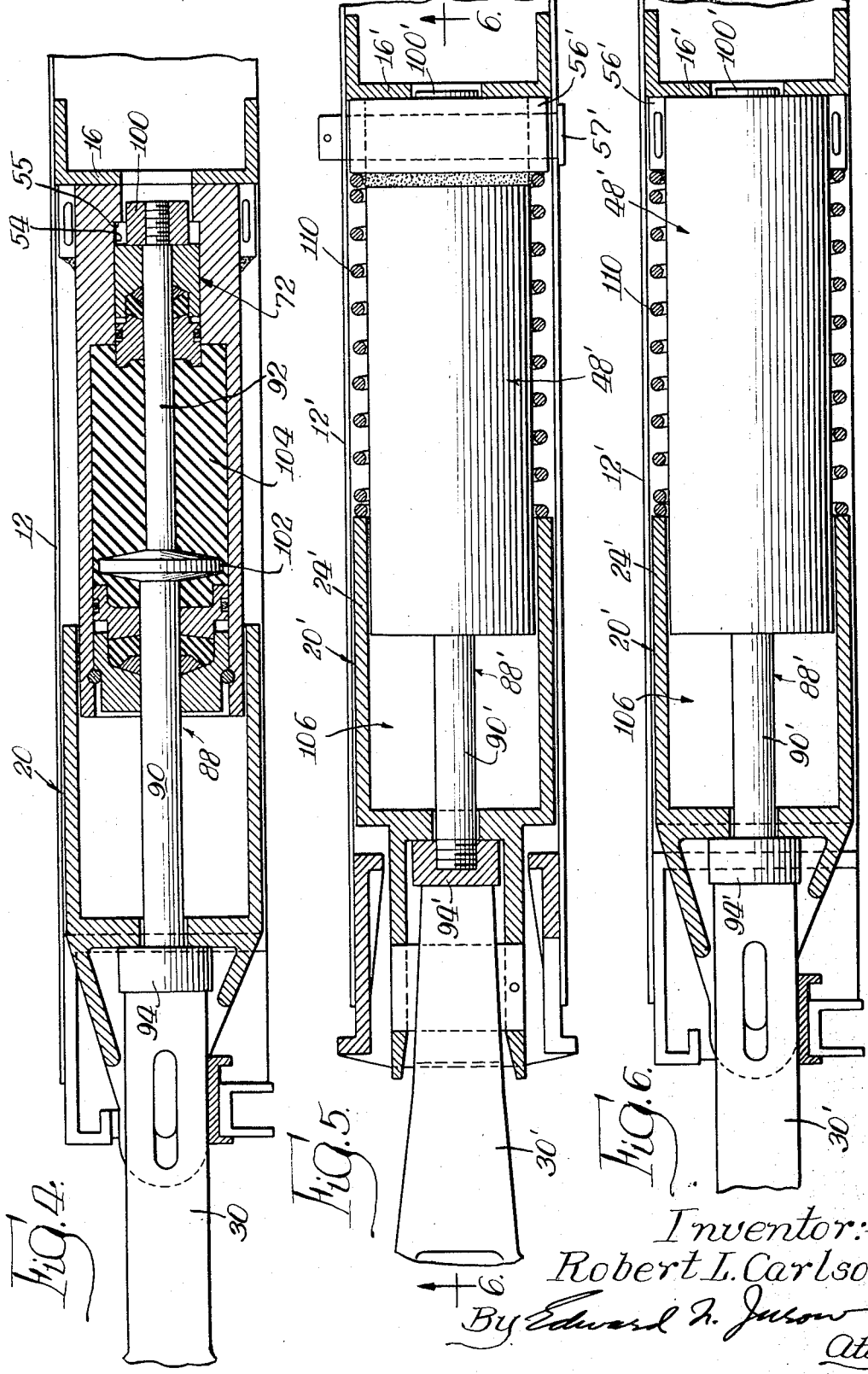
Inventor:—
Robert L. Carlson
By Edward F. Jurson
Atty.

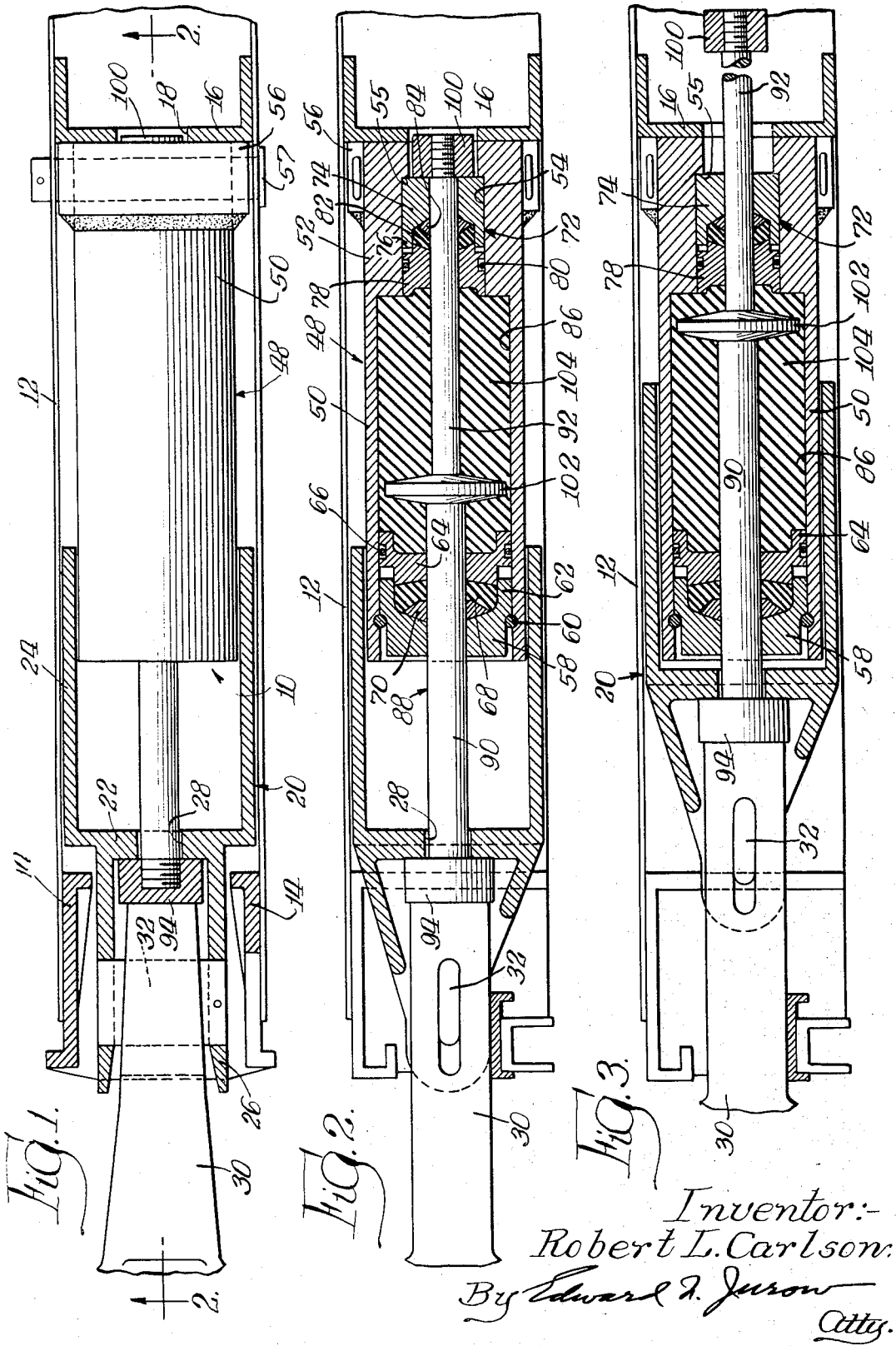

United States Patent Office 3,368,697
Patented Feb. 13, 1968

3,368,697
CUSHIONING DEVICE
Robert L. Carlson, Chicago, Ill., assignor to W. H. Miner Inc., Chicago, Ill., a corporation of Delaware
Filed Mar. 22, 1966, Ser. No. 536,451
10 Claims. (Cl. 213—40)

My present invention relates generally to a cushioning device for use, for example, in cushioning shock forces imposed on the coupler of a railway car, and the principal object thereof is the provision of a cushioning device comprised of a novel damped spring means that will absorb shock forces in both buff and draft.

The damped spring of my present invention, in general, comprises an elongated casing with a chamber therein, a piston rod extending through the chamber and having first and second sections, and a piston on the piston rod within the chamber intermediate the first and second piston rod sections. The first piston rod section, which is adapted to receive buff and draft forces from a coupler, has a larger diameter than the second piston rod section; and a collar assembly, which has a larger diameter than the first piston rod section, is arranged on the second piston rod section and is movable in one direction therewith. The piston provides axial orifice means, and the chamber is filled with a compressible solid. The first piston rod section moves into the chamber in response to buff forces, while the collar assembly moves into the chamber in response to draft forces. When either the first piston rod section or the collar assembly moves into the chamber, the reduction in volume of the compressible solid, and the throttling effect produced by the compressible solid being forced through the orifice means, impose a damping and spring force on the piston rod and the piston.

It is another object of my present invention to provide a damped spring, as described, wherein a differential pressure seal assembly is mounted in the casing about the first piston rod section and another differential pressure seal assembly is incorporated in the collar assembly about the second piston rod section. These differential seal assemblies furnish seals under a pressure that is higher than the pressure of the compressible solid in the chamber whereby to prevent extrusion of the compressible solid along the first and second piston rod sections.

It is a further object of my present invention to provide a cushioning device of the type described which is comprised of novel means for connecting the piston rod of the damped spring to the coupler of a railway car. In brief, the piston rod and the coupler are interconnected by a frame member that is slidably guided on the casing of the damped spring.

In one embodiment of cushioning device of my present invention, the compressible solid of the damped spring serves alone to return the piston rod to a neutral position. It is a still further object of my present invention to provide a modified embodiment of cushioning device wherein spring means in the form of a coil spring is arranged to impose an auxiliary spring force on the piston rod to assist in returning the latter to a neutral position. In this embodiment, the compressible solid of the damped spring is preferably preloaded whereby to balance the force of the coil spring when the piston rod reaches a neutral position.

Now in order to acquaint those skilled in the art with the manner of constructing and using cushioning devices in accordance with the principles of my present invention, I shall describe in connection with the accompanying drawings, preferred embodiments of my invention.

In the drawing:

FIGURE 1 is a fragmentary plan view, partly in horizontal section, of the center sill of a railway car truck in which is mounted one embodiment of cushioning device of my present invention;

FIGURE 2 is a sectional view, taken substantially along the line 2—2 in FIGURE 1, looking in the direction indicated by the arrows, with the elements of the cushioning device being shown in a neutral position;

FIGURE 3 is a sectional view corresponding generally to FIGURE 2, but with the elements of the cushioning device being shown near the terminus of maximum buff travel;

FIGURE 4 is a sectional view corresponding generally to FIGURE 2, but with the elements of the cushioning device being shown at the terminus of maximum draft travel;

FIGURE 5 is a fragmentary plan view, partly in horizontal section, of the center sill of a railway car truck in which is mounted a modified embodiment of cushioning device of my present invention; and FIGURE 6 is a side view, partly in section and partly in elevation, of the center sill and cushioning device of FIGURE 5.

Referring now to FIGURES 1 and 2, there is indicated generally by the reference numeral 10 one embodiment of cushioning device of my present invention which is adapted to be mounted in the end portion of the center sill 12 of a railway car. The center sill 12 is provided with front lugs 14 and a longitudinally spaced transverse rear lug bracket 16 having a central aperture 18 therethrough.

The forward portion, or connecting means, of the cushioning device 10 includes a coupler adapter or frame member 20 comprised of a transverse wall portion 22, a rear tubular portion 24, and a forward extension 26. The wall 20 at its center is formed with an aperture 28 and at its sides is engageable with the front lugs 14. The rear end of a coupler 30 is received in the extension 26 of the frame member 20 and is secured therein by means of a transverse key 32.

The cushioning device 10 further comprises a damped spring indicated generally by the reference numeral 48. The damped spring 48 includes a cylindrical casing 50 having a rear end wall portion 52 with a stepped axial bore 54 that defines an annular shoulder 55. The rear end of the casing 50 is held in abutment with the rear lug bracket 16 by collar means 56 secured as by welding to the casing 50 and key means 57 interconnecting the collar means 56 and the sill 12. The forward end of the casing 50 slidably receives and guides the tubular portion 24 of the frame member 20.

Mounted within the forward end of the casing 50 is a piston rod bearing or gland 58. The bearing 58 is restrained against outward movement by retainer ring means 60, and is formed with an annular flange portion 62 of enlarged inner diameter. Slidably mounted in the bearing flange 62 is the one end of an annular stepped floating sleeve member 64 which carries an O-ring or seal 66 that engages the inner wall of the casing 50. Interposed between the bearing 58 and the sleeve member 64 within the confines of the flange portion 62 are an annular seal 68 formed of a soft pliable material such as Teflon impregnated asbestos, and an annular anti-extrusion ring 70.

Mounted in the casing bore 54 is a collar assembly 71 which includes an axially movable piston rod bearing or gland 74. The bearing 74 normally seats against the casing shoulder 55, and is formed with an annular flange portion 76 of enlarged inner diameter. Slidably mounted in the bearing flange 76 is the one end of an annular stepped floating sleeve member 78 which carries an O-ring or seal 80 that engages the inner wall of the bore 54. Interposed between the bearing 74 and the sleeve member 78 within the confines of the flange portion 76 are an annular seal 82 formed of a soft pliable material such as Teflon impregnated asbestos, and an annular anti-extrusion ring 84. The sleeve members 64 and 78 serve to define with the casing 50 a chamber 86.

Extending through the chamber 86 is a piston rod 88 comprised of a first forward section 90 and a second rearward section 92. The first section 90 projects through the sleeve member 64, the seal 68, the ring 70, and the bearing 58. The forward end portion of the first piston rod section 90 extends through the aperture 28 of the frame member 20 and has threaded thereon a bearing nut 94 against which the rear end of the coupler 30 abuts. The piston rod 88 is thus interconnected by the frame member 20 to the coupler 30 and is caused to move conjointly therewith. The second piston rod section 92 projects through the sleeve member 78, the seal 82, the ring 84 and the bearing 74. The rear end of the piston rod section 92 has threaded thereon an end member 100 that normally abuts the bearing 74 of the collar assembly 72.

The end member 100 permits the second piston rod section 92 to move to the right, as viewed in FIGURE 2, relative to the collar assembly 72, and yet causes the collar assembly 72 to move conjointly with the second piston rod section 92 when the latter moves to the left from the position shown in FIGURE 2. It will also be noted that the first piston rod section 90 has a larger diameter than the second piston rod section 92, and that the collar assembly 72 has a larger diameter than the first piston rod section 90. Formed on the piston rod 88 intermediate of the first and second piston rod sections 90 and 92 is a piston 102. The outer periphery of the piston 102 is spaced from the interior of the chamber 86 whereby to provide axial orifice means in the form of an annular orifice. Finally, the chamber 86 is filled with a compressible solid or elastomer 104 such as silicone rubber.

In the operation of the cushioning device 10, buff forces imposed on the coupler 30 causes the latter, the coupler adapter 20, the piston rod 88 and the piston 102 to move to the right from the position shown in FIGURES 1 and 2 toward the position shown in FIGURE 3. As the first piston rod section 90 enters the chamber 86 while the second piston rod section 92 moves out, the volume of the chamber is reduced to the extent that displacement by the section 90 exceeds the displacement by the section 92, thus increasing the pressure of the compressible solid 104 in the chamber. Concurrently, the compressible solid 104 is metered through the annular orifice surrounding the piston 102 thereby producing a throttling effect. The described volume-pressure change of the compressible solid, and the attendant throttling effect, impose a damping and spring force on the piston and the piston rod, and thereby serve to dissipate the energy of buff forces received by the piston rod 88 from the coupler 30.

When the buff forces are fully dissipated, or removed from the coupler 30, the pressure of the compressible solid 104, acting on the unbalanced area between the first and second piston rod sections 90 and 92, causes the piston 102 and the piston rod 88 to return to the neutral position shown in FIGURES 1 and 2. During the return stroke of the piston rod 88, the compressible solid flows back through the annular orifice surrounding the piston 102 to fill the space being vacated by the latter. Also, the piston rod 88, acting through the bearing nut 94, returns the coupler 30 and frame member 20 to their normal rest position.

The cushioning device 10 also operates in draft. In this circumstance, draft forces imposed on the coupler 30 cause the key 32 to draw the frame member 20 to the left from the position shown in FIGURES 1 and 2 toward the position shown in FIGURE 4. The frame member 20, in turn, by reason of its engagement with the bearing nut 94, causes the piston rod 88 and the piston 102 to move to the left. During such movement, the compressible solid 104 is metered through the annular orifice surrounding the piston 102 thereby producing a throttling effect. Also, as the collar assembly 72 enters the chamber 86 while the first piston rod section 90 moves out, the volume of the compressible solid 104 is reduced thereby increasing the pressure therein. The resultant throttling effect and volume-pressure change of the compressible solid serve to dissipate the energy of draft forces received by the piston rod 88 from the coupler 30. When the draft forces are removed or fully dissipated, the pressure of the compressible solid 104, acting on the unbalanced area between the first piston rod section 90 and the collar assembly 72, causes the piston rod 88, the frame member 20 and the coupler 30 to return to the neutral or rest position shown in FIGURES 1 and 2.

In the foregoing described damped spring 48, the floating sleeve member 64, the seal 68 and the anti-extrusion ring 70 serve as a differential pressure seal assembly about the first piston rod section 90. Additionally, the floating sleeve member 78, the seal 82 and the anti-extrusion ring 84 serve as another differential pressure seal assembly about the second piston rod section 92. The arrangement of these seal assemblies is such that the seals 68 and 82 are maintained under a higher pressure than the pressure of the compressible solid 104 in the chamber 86. Thus, positive dams, which automatically adjust for wear, are provided for preventing extrusion of the compressible solid along the first and second piston rod sections 90 and 92. It will be appreciated by those skilled in the art that the characteristics of the damped spring 48 may be varied by changing the relative diameters of the first and second piston rod sections 90 and 92 and of the collar assembly 72, or by altering the area of the annular orifice surrounding the piston 102, or both.

A second embodiment of cushioning device 106 is shown in FIGURES 5 and 6. Primed reference numerals have been used to indicate components that are the same or similar to components identified in FIGURES 1–4. In the cushioning device 106, a coil spring 110 is arranged concentrically about the damped spring 48'. The forward end of the coil spring 110 engages the rear end of the tubular portion 24' of the frame member 20', while the rearward end of the coil spring engages the collar means 56'. Under extremely low temperature operating conditions, the viscosity of the compressible solid of the damped spring 48' tends to increase causing a decrease in the return spring force of the solid. To compensate for such conditions in buff, the coil spring 110 provides an auxiliary spring force on the piston and piston rod of the damped spring 48' to assist in returning the piston rod 88' to its neutral position. In addition, the compressible solid within the damped spring 48' is preferably preloaded whereby to balance the force of the coil spring 110 when the piston rod 88' reaches a neutral position. The spring 110 is thus prevented from returning the piston rod beyond the neutral position; otherwise, the cushioning capacity of the damped spring 48' in draft would be decreased or nullified. In all other essential respects, the cushioning device 106 functions in the same manner as the device 10 in both buff and draft, and offers the same features and advantages as the device 10.

While I have shown and described what I believe to be preferred embodiments of my present invention, it will be understood by those skilled in the art that various rearrangements and modifications may be made therein without departing from the spirit and scope of my invention.

I claim:

1. A damped spring comprising an elongated casing with a chamber therein, a piston rod extending through said chamber and having first and second sections, said first piston rod section having a larger diameter than said second piston rod section, a collar assembly on said second piston rod section and being movable in one direction therewith, said collar assembly having a larger diameter than said first piston rod section, a piston on said piston rod within said chamber intermediate said first and second piston rod sections and presenting axial orifice means, and a compressible solid filling said chamber for providing a damping and spring force on said piston rod and said piston as said first piston rod section or said collar assembly moves into said chamber and reduces the volume of said solid.

2. The damped spring of claim 1 wherein said second piston rod section is slidable relative to said collar assembly as said first piston rod section moves into said chamber, and said second piston rod section has an end member exteriorly of said chamber that is engageable with said collar assembly for moving the latter into said chamber as said first piston rod section moves out of said chamber.

3. The damped spring of claim 1 wherein said casing includes an end wall with a bore therein, said collar assembly is normally disposed in said bore and restrained against movement in a direction away from said chamber, said second piston rod section is slidable relative to said collar assembly as said first piston rod section moves into said chamber, and said second piston rod section has an end member exteriorly of said chamber that is engageable with said collar assembly for moving the latter into said chamber as said first piston rod section moves out of said chamber.

4. The damped spring of claim 3 wherein said collar assembly includes a piston rod bearing for slidably guiding said second piston rod section in said bore, and a differential pressure seal assembly for providing a seal about said second piston rod section under a pressure that is higher than the pressure of said compressible solid in said chamber whereby to prevent extrusion of said compressible solid along said second piston rod section.

5. The damped spring of claim 4 wherein said differential pressure seal assembly is comprised of a sleeve member slidable in said bore, and a pliable seal and an anti-extrusion ring interposed between said piston rod bearing and said sleeve member.

6. The damped spring of claim 1 wherein a piston rod bearing is mounted in said casing for slidably guiding said first piston rod section, a sleeve member is slidably mounted in said casing about said first piston rod section, and a pliable seal and anti-extrusion ring are interposed between said piston rod bearing and said sleeve member whereby to provide a seal under a pressure that is higher than the pressure of said compressible solid in said chamber to prevent extrusion of said compressible solid along said first piston rod section.

7. The damped spring of claim 1 wherein said axial orifice means is an annular orifice defined between the periphery of said piston and the interior of said chamber.

8. In combination with the damped spring of claim 1, spring means exteriorly of said casing and acting on said piston rod for providing an auxiliary spring force on the latter.

9. In combination with the damped spring of claim 1, a coupler adapter slidably guided on said casing and movable conjointly with said piston rod.

10. The combination of claim 9 including a coil spring surrounding said casing and engageable at one end with said coupler adapter for providing an auxiliary spring force on said piston rod.

References Cited

UNITED STATES PATENTS

| | | | |
|---|---|---|---|
| 2,846,211 | 8/1958 | Taylor | 267—63 |
| 3,053,526 | 9/1962 | Kendall | 267—1 |
| 3,178,036 | 4/1965 | Cardwell | 213—40 X |
| 3,178,037 | 4/1965 | Kendall | 213—40 |

ARTHUR L. LA POINT, *Primary Examiner.*

D. E. HOFFMAN, *Assistant Examiner.*